United States Patent

Sampson

Patent Number: 5,209,183
Date of Patent: May 11, 1993

[54] PORTABLE FEEDER APPARATUS

[75] Inventor: Darwin L. Sampson, Salina, Kans.

[73] Assignee: Grain Belt Supply, Inc., Salina, Kans.

[21] Appl. No.: 958,657

[22] Filed: Oct. 8, 1992

[51] Int. Cl.$^5$ .................................................. A01K 5/00
[52] U.S. Cl. ........................................................... 119/53
[58] Field of Search ................ 119/53, 53.5, 52.1, 119/54, 20

[56] References Cited

U.S. PATENT DOCUMENTS

| | | | |
|---|---|---|---|
| 1,061,710 | 5/1913 | Webb | 119/53 |
| 1,246,751 | 11/1917 | Kauill | 119/53 |
| 2,457,432 | 12/1948 | Ballard | 119/53 |
| 2,661,720 | 12/1953 | Rysdon et al. | 119/53 |
| 2,974,634 | 3/1961 | Williams et al. | 119/53 |
| 3,565,044 | 2/1971 | Sorrels | 119/53 |
| 4,312,297 | 1/1982 | Roberts | 119/53 |
| 4,334,502 | 6/1982 | Cox | 119/53 |

Primary Examiner—Gene Mancene
Assistant Examiner—Thomas Price
Attorney, Agent, or Firm—Hovey, Williams, Timmons & Collins

[57] ABSTRACT

A feeder apparatus includes a feed hopper including front and rear end walls, a pair of opposed side walls each formed by upper and lower side panels secured together by a first plurality of removable fasteners, and a lid movable between open and closed positions. The side walls are attached to the front end wall by a second plurality of removable fasteners and to the rear end wall by a third plurality of removable fasteners. A feed tray assembly is secured between the front and rear end walls by a fourth plurality of removable fasteners. The feed tray assembly includes a tray and a pair of opposed side rails attached to the tray by a fifth plurality of removable fasteners. An axle assembly including an axle and a pair of opposed side mounting plates is attached to the hopper by several of the fifth plurality of removable fasteners so that the axle assembly may be added to or removed from the apparatus without requiring modification of the apparatus or further fasteners.

8 Claims, 2 Drawing Sheets

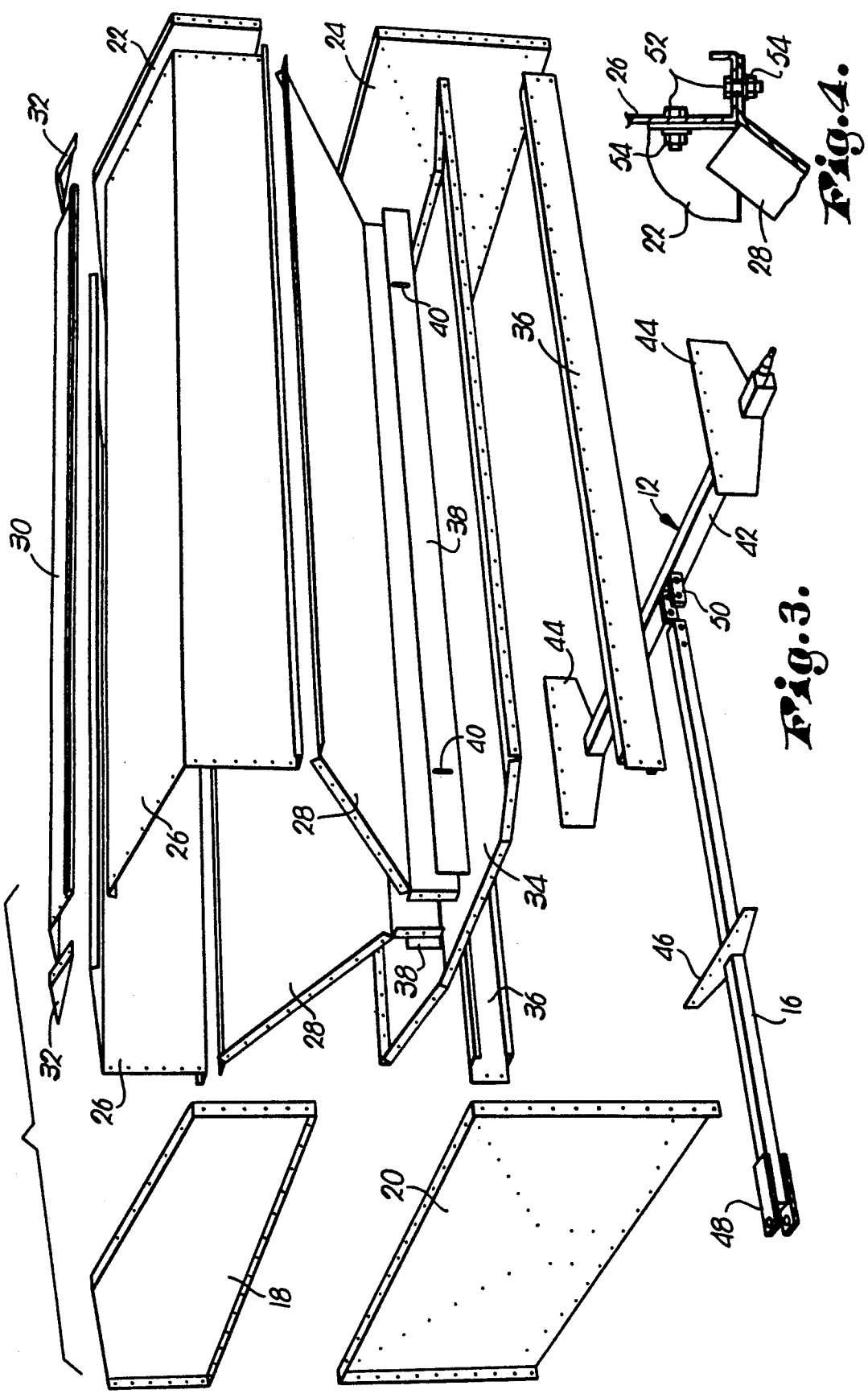

PORTABLE FEEDER APPARATUS

BACKGROUND OF THE INVENTION

1. Field of the Invention

The present invention relates generally to portable livestock feeders and, more particularly, to a convertible feeder apparatus which can be completely knocked down for shipping, and which may be fitted with any of a number of various optional features without requiring modification of the apparatus.

2. Discussion of the Prior Art

It is known to provide a portable feeder including a hopper formed of a pair of opposed side walls and front and rear end walls, wherein the walls are welded together during construction. In this known device, the front and rear end walls extend beneath the hopper and support a feed tray assembly which is welded to the end walls. If desired, the apparatus may be manufactured with an axle assembly including a pair of wheels and a tow bar, such that the apparatus may be pulled behind a tractor or the like during use. Otherwise, the hopper may be constructed with a skid assembly, or with a plurality of legs on which the hopper may be supported.

Because the hopper components, as well as the feeder tray and axle assembly, are welded together during manufacture, it is impossible to knock down the completed apparatus for shipping. Instead, a number of the completed feeders are arranged side-by-side along the length of a trailer for shipping. Thus, only five or six of the welded feeders can be shipped on a single truck.

OBJECTS AND SUMMARY OF THE INVENTION

It is an object of the present invention to provide a feeder apparatus which can be completely knocked down for shipping, and which may be fitted with any of a number of various optional features without requiring modification of the apparatus.

Another object is to provide an apparatus capable of being retrofitted in the field, by a layman, with replacement parts or optional features provided by the manufacturer, without requiring that the trailer be returned to the manufacturer for such conversion.

In accordance with these and other objects evident from the following disclosure, a feeder apparatus constructed in accordance with the present invention comprises a feed hopper including front and rear end walls, a pair of opposed side walls each formed by upper and lower side panels secured together by a first plurality of removable fasteners, and a lid movable between open and closed positions. The side walls are attached to the front end wall by a second plurality of removable fasteners and to the rear end wall by a third plurality of removable fasteners.

A feed tray assembly is secured between the front and rear end walls by a fourth plurality of removable fasteners. The feed tray assembly includes a tray and a pair of opposed side rails attached to the tray by a fifth plurality of removable fasteners. An axle assembly is provided and includes an axle, and a pair of opposed side mounting plates attached to the side rails of the feed tray assembly by several of the fifth plurality of removable fasteners so that the axle assembly may be added to or removed from the apparatus without requiring modification of the apparatus or further fasteners.

Numerous advantages are obtained through the use of such a construction. For example, by connecting the various components together with removable fasteners, the components may be shipped unassembled, allowing up to 30 or more of the feeders to be loaded onto a single trailer. This represents a savings of more than about 80% over shipping costs of conventional, welded units.

Another advantage resides in the ability of a consumer to select any of a number of different optional features at the time of purchase, and to later obtain additional optional features which can be assembled by the consumer without requiring the apparatus to be returned to the manufacturer. Further, if additional features are purchased, many of the same fasteners already used in the apparatus may be removed and used again to secure the additional features in place.

BRIEF DESCRIPTION OF THE DRAWING FIGURES

A preferred embodiment of the invention is described in detail below with reference to the attached drawing figures, wherein:

FIG. 3 is an exploded perspective view of the feeder apparatus; and

FIG. 4 is a fragmentary sectional view of a joint of the apparatus, illustrating the preferred construction of a removable fastener of the type used throughout the apparatus.

DETAILED DESCRIPTION OF THE PREFERRED EMBODIMENT

Figure 1:
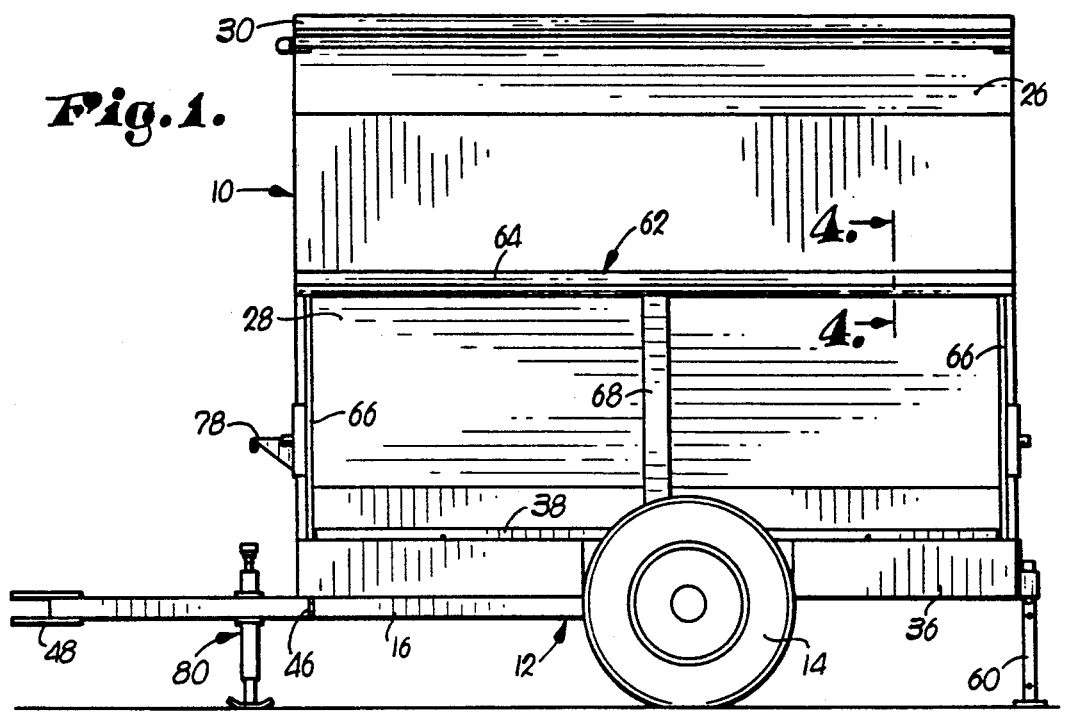
FIG. 1 is a side elevational view of a portable feeder apparatus constructed in accordance with the preferred embodiment of the invention.

A portable feeder apparatus constructed in accordance with a preferred embodiment of the invention is shown in FIG. 1, and generally includes a hopper 10 mounted on an axle assembly 12 including a pair of wheels 14 and a tow bar 16.

Turning to FIG. 3, the hopper 10 is shown to include a front end wall formed of upper and lower front end panels 18, 20, of a material such as galvanized sheet metal. The upper panel 18 includes an outward directed flange extending along both lateral edges, and the lower and upper edges thereof. The lower panel 20 includes an outward directed flange extending along both lateral edges and the upper edge thereof. The flanges of panels 18, 20 are provided with a plurality of spaced openings through which removable fasteners may be received, and the panels are secured together by removable fasteners extending through the upper flange of the lower panel and the lower flange of the upper panel.

The rear end wall, also formed of galvanized sheet metal, includes upper and lower end panels 22, 24, each of which are provided with outward directed flanges similar to the flanges of the front panels 18, 20 and formed with a plurality of spaced openings. These panels 22, 24 are also secured together by removable fasteners extending through the upper flange of the lower panel and the lower flange of the upper panel.

The hopper 10 further includes a pair of opposed side walls, each formed by upper and lower side panels 26, 28. Each upper side panel is formed of a single piece of material, preferably galvanized sheet metal, which is bent inward along a longitudinal axis, and includes an inward directed longitudinal flange along the upper edge thereof, and an outward directed longitudinal flange along the lower edge thereof. Spaced holes are provided in the front and rear edges of the upper panels as well as along the lower flange so that removable fasteners may be used to connect the upper panels 26 to the upper end panels 18, 22 and to the lower side panel 28.

Each lower side panel 28 is formed of a single sheet of material, such as galvanized sheet metal, which is bent outward along a longitudinal axis, and includes an outward directed longitudinal flange along the upper edge thereof and inward directed flanges along the front and rear edges thereof. A plurality of spaced holes are provided in the flanges of the lower side panels to enable the panels 28 to be secured by removable fasteners with the lower end panels 20, 24 and the upper side panels 26.

Figure 2:
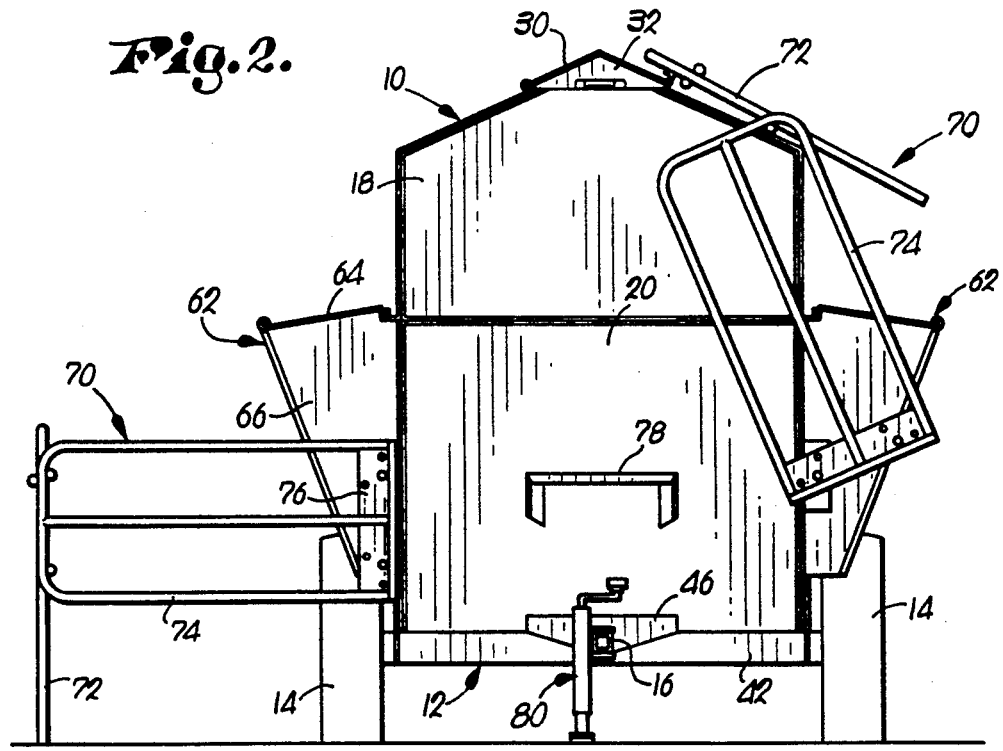
FIG. 2 is a front elevational view of the feeder apparatus.

A lid 30, formed of galvanized sheet metal or the like, is supported at the top of the hopper 10 and is movable between open and closed positions. Preferably, as shown in FIG. 2, a number of hinges secure the lid to one of the upper side panels 26 in order to permit the lid to be pivoted relative to the hopper. The lid includes a single piece of material which is bent in the shape of a chevron, and end panels 32 are provided on the lid for adding rigidity thereto. An additional central brace shaped similarly to the end panels may also be provided.

A feed tray assembly is secured between the front and rear lower end panels and includes a tray 34 and a pair of opposed side rails 36 attached to the tray. The tray 34 is formed of a single sheet of material, such as galvanized sheet metal, including a central portion and a pair of lateral, longitudinally extending wings. An upward directed flange extends completely around the tray and is provided with a plurality of spaced openings for permitting removable fasteners to be used in securing the tray 34 between the lower end panels 20, 24 and for attaching the side rails 36 to the tray. Each side rail 36 includes a single sheet of material, such as galvanized sheet metal, which is formed into a channel that is received over the upward directed flange of the tray along the length thereof.

A small space is defined between each of the lower side panels 28 and the upper surface of the tray 34 when the apparatus is assembled. This space permits feed within the hopper to pour out onto the tray for access to animals. In order to control the amount of feed reaching the tray, a gate 38 is provided on each lower side panel 28. Preferably, the gate is formed with a pair of spaced, vertically extending slots 40 which align with a pair of holes formed adjacent the lower edge of each lower side panel 28. Removable fasteners extend through the slots and holes in order to retain the gates 38 on the panels 28, and these fasteners may be loosened to permit adjustment in the position of the gates so that the size of the gap may be increased or decreased as desired.

The axle assembly 12 includes an axle 42, the wheels 14, and a pair of opposed side mounting plates 44 attached to the side rails 36 of the feed tray assembly by several of the plurality of removable fasteners used to secure the side rails to the tray 34. Thus, the axle assembly may be added to or removed from the apparatus without requiring modification of the apparatus or further fasteners.

A tow bar assembly is provided in association with the remainder of the axle assembly. The tow bar assembly includes the tow bar 16 and a front mounting plate 46 attached to the lower front end panel 20 by several of the plurality of removable fasteners used to secure the lower front end panel to the tray 34. The front end of the tow bar is provided with a hitch plate 48 permitting attachment of the apparatus to a towing vehicle, and the rear end of the tow bar is connected to the axle via a pair of spaced tie plates 50. Preferably, removable fasteners are used to secure the tow bar to the axle such that the assemblies may be knocked down for shipping.

Preferably, the removable fasteners used throughout the apparatus include bolts 52 and nuts 54 as shown in FIG. 4. An exception may be the fasteners used to retain the gates on the lower side panels, which fasteners may include wing nuts in place of conventional flat-sided nuts.

Returning to FIG. 1, it is possible to provide an adjustable rear stand assembly 56 on the apparatus which is used to stabilize the apparatus during use. The stand includes a mounting plate 58 secured to the rear end wall by several of the plurality of removable fasteners used to secure the lower rear end panel 24 to the tray 34, and a stand 60 supported on the mounting plate for relative movement between a retracted, storage position and an extended, supporting position. The stand is illustrated in FIG. 1 in the extended, supporting position.

As illustrated in FIG. 2, a rain shield assembly 62 is attached to each side of the hopper 10 for covering the feed tray assembly and protecting the feed tray assembly from exposure to rain. Preferably, each rain shield assembly includes a top panel 64 and a pair of spaced end panels 66, all of which are secured to the hopper by removable fasteners. Preferably, the same removable fasteners are used that connect the lower side panels to the lower end panels. A central brace 68, shown in FIG. 1, may also be provided to add rigidity to the construction.

Returning to FIG. 2, the apparatus is shown to include a creep assembly 70 secured to each side of the hopper. Each assembly 70 includes a creep attachment 72 that is supported for pivotal movement between a pair of end gates 74. These end gates 74 are each provided with a hinged bracket 76 that is secured to the hopper and which allows pivotal movement of the end gates between a lowered, use position, as shown in the left half of FIG. 2, and a raised, storage position, as shown in the right half of FIG. 2. The construction of the creep attachment assemblies is conventional except for the use of removable fasteners to secure the assemblies to the hopper.

Additional features which may be employed in the preferred construction include a step 78 formed on the lower front end panel, and a hand-operated jack stand 80 secured to the tow bar.

By constructing the apparatus in accordance with the preferred embodiment, it is possible to incorporate whichever features of the inventive construction are desired without requiring the manufacturer to custom build each unit. Further, all of the desired features may be packed and shipped with the remainder of the apparatus, and assembled in the field by either a dealer or consumer.

Although not shown, it is also possible to employ skids in place of the wheels, such skids being attached to the axle, or directly to the hopper, in a conventional manner. Further, it is possible to provide additional, intermediate side panels and end panels which can be interposed between the illustrated upper and lower panels in order to add additional height and capacity to the hopper. These intermediate side and end panels would also be formed of galvanized sheet metal of the like, and would include outward directed flanges along each of the edges thereof in order to permit attachment of the intermediate panels to the remaining panels with removable fasteners.

It is understood that although the invention has been described with reference to the preferred embodiment illustrated in the attached drawing figures, it is possible for substitutions and equivalents to be made without departing from the scope of the invention as recited in the claims.

What is claimed is:

1. A feeder apparatus comprising:
   a feed hopper including front and rear end walls, a pair of opposed side walls each formed by upper and lower side panels secured together by a first plurality of removable fasteners, and a lid movable between open and closed positions, the side walls being attached to the front end wall by a second plurality of removable fasteners and to the rear end wall by a third plurality of removable fasteners;
   a feed tray assembly secured between the front and rear end walls by a fourth plurality of removable fasteners, the feed tray assembly including a tray and a pair of opposed side rails attached to the tray by a fifth plurality of removable fasteners; and
   an axle assembly including an axle, and a pair of opposed side mounting plates attached to the side rails of the feed tray assembly by several of the fifth plurality of removable fasteners so that the axle assembly may be added to or removed from the apparatus without requiring modification of the apparatus or further fasteners.

2. The feeder apparatus as recited in claim 1, wherein the hopper includes at least one gate for controlling the flow of feed from the hopper onto the tray, and mounting means for mounting the at least one gate on the hopper and for permitting adjustment of the position of the gate relative to the hopper.

3. The feeder apparatus as recited in claim 1, wherein the front and rear end walls each include an upper end panel and a lower end panel attached together by a sixth plurality of removable fasteners.

4. The feeder apparatus as recited in claim 1, wherein the axle assembly includes a tow bar provided with a front mounting plate for permitting attachment of the tow bar to the front end wall by several of the fourth plurality of removable fasteners, and means for attaching the tow bar to the axle.

5. The feeder apparatus as recited in claim 1, further comprising a rear stand assembly for supporting the rear end of the apparatus, the rear stand assembly including a mounting plate secured to the rear end wall by several of the fourth plurality of removable fasteners, and a stand supported on the mounting plate for relative movement between a retracted position and an extended position.

6. A feeder apparatus as recited in claim 1, further comprising a rain shield assembly attached to each side wall for covering the feed tray assembly and protecting the feed tray assembly from exposure to rain.

7. A feeder apparatus as recited in claim 1, further comprising a creep assembly attached to each side wall.

8. A feeder apparatus as recited in claim 1, wherein each removable fastener includes a bolt and a nut.

* * * * *